324-77 CROSS REFERENCE SEARCH ROOM

Feb. 19, 1963 S. J. CAMPANELLA ET AL 3,078,345

SPEECH COMPRESSION SYSTEMS

Filed July 31, 1958 5 Sheets-Sheet 1

INVENTORS
THOMAS E. BAYSTON
SAMUEL J. CAMPANELLA
BY W. Robert Baylor
Hyman Hurvitz INVENTORS
THOMAS E. BAYSTON
BY SAMUEL J. CAMPANELLA
W. Robert Baylor
Hyman Hurvitz

*INVENTORS*
THOMAS E. BAYSTON
SAMUEL J. CAMPANELLA
BY W. Robert Baylor
Hyman Hurvitz INVENTORS
THOMAS E. BAYSTON
SAMUEL J. CAMPANELLA
BY
W. Robert Baylor
Hyman Hurvitz INVENTORS
THOMAS E. BAYSTON
SAMUEL J. CAMPANELLA
BY W. Robert Baylor
Hyman Hurvitz 3,078,345

SPEECH COMPRESSION SYSTEMS

Samuel J. Campanella, Washington, D.C., and Thomas E. Bayston, Maitland, Fla., assignors, by mesne assignments, to Melpar, Inc., Falls Church, Va., a corporation of Delaware Filed July 31, 1958, Ser. No. 752,253
17 Claims. (Cl. 179—15.55)

The present invention relates generally to speech compression systems, and more particularly to systems for converting speech to control signals occupying a frequency band far narrower and requiring an information rate far less than is normally required for speech, and for synthesizing speech at a remote location in response to the control signals, whereby the transmission link from a location at which speech originates and a remote location at which speech is received may be linked by an extremely narrow band communication channel.

Speech communication is widely recognized as the most satisfactory mode of transmitting intelligence in a form which makes least demand on the human being, whether at the transmitting or the receiving end of a communication channel, and a form which is most readily acceptable and rapidly comprehensive by the human operator. When voice communication is compared with other forms of communication, as for example teletype, in terms of equivalent word content information, communication by voice may be shown to represent a very uneconomical utilization of spectrum space. Voice communication by conventional transmission systems normally requires a bandwidth of approximately 3,000 c.p.s. at an information rate of 24,000. to 50,000. bits per second, whereas transmission of the word equivalent of speech intelligence by teletype at a comparable rate requires as little as 75 c.p.s. of bandwidth at an information rate of approximately 75 bits per second. This large difference in bandwidth and information rate between conventional voice and teletype communication for the same word content can be attributed to the highly redundant nature of the human speech signal and to the transmission of information concerning speaker identity and emotional status of the speaker. Speech signals may be translated into less redundant signal form, which may possess reduced speaker identity, or emotional status, and in general reducing in the speech signal those components which are not essential to message intelligibility. Thereby, a twenty to one compression in the bandwidth and information rate required to transmit the equivalent word intelligence of speech may be achieved at extremely slight loss in sentence intelligibility rating.

In accordance with the present invention a continuous speech bandwidth compression system consists of two units called an analyzer and a synthesizer, which respectively convert speech into control signals, and synthesize speech in response to the control signals. The analyzer delivers compressed speech information in the form of analogue control signals. These control signals are utilized by the synthesizer to generate synthesized speech which retains the word equivalent intelligence of the original speech supplied to the analyzer. Each of the control signals, which may be called hereinafter speech signal parameters, may be identified with some feature of a human vocal mechanism.

Briefly described, the human vocal mechanism or vocal tract consists of a tube terminated by the larynx at one end and by the lips at the other end. Acoustic excitation is supplied in the form of periodic pressure waves generated at the larynx or by turbulence generated at a point of constriction along the tube. The sounds produced by the periodic larynx excitation are generally referred to as being voiced and exhibit a pitch frequency characteristic, whereas sounds produced by turbulent excitation are referred to as being unvoiced, and are noise-like. The human being is capable of controlling the sources of excitation and the transmission characteristics of the entire vocal tract, and thereby controlling the acoustical character of the sounds emitted at the lips, which give rise to the phenomenon of speech.

The principal element which controls vocal tract variation is the tongue. The tongue position divides the vocal tract into principal resonant cavities, which to a large extent control the transmission characteristics of the vocal tract. These transmission characteristics may also be modified by coupling into the nasal cavity, such coupling being controlled by the velum. Within this vocal cavity resonance transmission characteristics, acting on the source signal provided by the larynx, pass certain frequency components with lower attenuation than others, with the result that the transmitted signal has a spectrum of relatively complex form, the frequency structure of which is produced by harmonics of the periodic larynx excitation and the amplitudes of the several frequency components of which are controlled by the resonance characteristics of the vocal tract. The fundamental frequency of the larynx excitation i.e., the frequency difference between harmonic components of speech signal, is referred to as the pitch frequency. Peaks of energy observed in the spectral distribution, resulting from the influence of the vocal cavity, are referred to as formants. For male speakers the center frequencies of the first three principal formants, designated as F1, F2 and F3, fall in the respective frequency ranges 200. to 1,000. c.p.s., 800. to 2,300. c.p.s. and 2,300. to 3,800. c.p.s. The spectral distribution for unvoiced excitation is similar to that for voiced excitation except in that the harmonic structure does not exist for unvoiced excitation, i.e., the spectral structure is noise-like.

The word "sonogram" refers to a plot of the spectral energy distribution in sound, as a function of frequency along one axis and time along another axis. Typical speech sounds, recorded in form of sonograms, show that each vowel sound in speech is characterized by a different set of steady-state formant positions. It is found that three formants are adequate to specify any vowel sound. When an ordinary sentence is spoken at a normal rate by a speaker, it may be seen that the formants move about in frequency position, as the sentence proceeds, as functions of the articulatory mechanism positions. Sometimes, the formants maintain steady positions for short-time intervals, and at other times the formants are in process of motion frequency-wise. The transitions play an important role in the production of diphthongs and consonants. Bursts of noise also occur, which occupy definite frequency position, which are known to constitute cues important to the identification of fricative consonants.

On the basis of the above analysis it may be expected that artificial speech can be produced in response to a small number of parameters, which possess rates of change no greater than those occurring in the human articulatory mechanism.

Briefly describing a preferred embodiment of the present invention, the analyzer consists of three separate formant trackers, each of which generates an analogue signal having an amplitude representative of the frequency centroid of the spectral energy falling in the frequency range most probably occupied by the formant involved. The use of frequency centroids to identify speech formants is a princpial feature of the present invention. The first formant centroid computer employs the outputs of eight filters starting with a 125. c.p.s. unit, and ending with a 1,000. c.p.s. unit, in 125. c.p.s. steps. The second formant centroid computer employs thirteen filters, each covering the range of 125. c.p.s. and starting at 875. c.p.s.

and ending at 2,375. c.p.s. The third formant centroid computer employs thirteen filters, each covering the range of 125. c.p.s. bandwidth, starting at 2,250. c.p.s. and ending at 3,750. c.p.s. Analogue signals generated by the three computers, and representative of the frequency centroids, are transmitted over three separate channels, in each of which may be included a 25 c.p.s. low-pass filter.

A fourth channel of the analyzer separates the speech signal into two frequency bands, one above 1,000. c.p.s. and the other below 1,000. c.p.s., detects the amplitudes or energies of the two frequency bands, and generates amplitude control signals in response thereto. These amplitude control signals are converted into logarithmic form, i.e., are amplitude compressed, and thereafter are passed through 25 c.p.s. low-pass filters. The outputs of the two low-pass filters then represent low frequency and high frequency intensities of the speech input signal, to a logarithmic scale. As a last element the analyzer provides a positive analogue signal representative of pitch frequency of voiced speech, which is also filtered prior to utilization, to remove all components above 25 c.p.s., and a negative value of the last-mentioned signal to represent absence of speech or unvoiced speech.

In summary, the analyzer provides signals in six channels, three of which represent the frequency centroids of the spectral energy of three principal speech formants. A fourth channel represents the average amplitude of energy from above 1,000. c.p.s. in the speech signal. A fifth channel represents the average amplitude energy of speech frequency components falling below 1,000 c.p.s., and a sixth channel represents the character of the speech, as voiced, unvoiced or absent, and frequency of the pitch of the speech, if voiced. Clearly, when no speech is present, or when the speech is not produced by the larynx, there will be no pitch frequency signal. The pitch frequency channel is designed, accordingly, to produce a fixed negative signal for unvoiced sounds and for silence, but to produce a positive signal having an amplitude proportional to fundamental pitch of the speech, the positive signal varying from 0 volt at 70 c.p.s. pitch. In one sense, then, the sixth channel transmits two signals on a time-sharing basis.

The synthesizer of the present invention is required to synthesize speech in response to the six signals provided by the analyzer. At the synthesizer is provided three frequency generators, in the form of multi-vibrators, each pertaining to one of the formants. The multi-vibrators are frequency modulatable, respectively, in response to the formant control signals, the number one channel being frequency modulatable over the range 18.0 to 19.0 kc., the second formant channel being modulatable over the range 18.8 and 20.4 kc., and the third formant channel being modulatable over the range 20.3 to 21.8 kc. A blocking oscillator is provided which synchronizes the frequency of the three multi-vibrators in the following sense. The blocking oscillator generates sharp pulses controlled in frequency by the pitch control signal. It, therefore, has a pulse frequency equal to the pitch frequency of the voice as measured at the analyzer. This is a relatively low frequency, i.e., low with respect to any frequency generated by any of the multi-vibrators. The multi-vibrators, accordingly, generate groups of oscillations, each group being started in response to a pitch frequency pulse. Thereby, the phases of the multi-vibrator output signals are locked to the pitch frequency. As to be indicated hereinafter the formant multivibrator outputs control the formant positions in the synthesized speech.

The pitch control channel has been stated to provide a negative signal of fixed amplitude for unvoiced condition, and a positive signal extending from zero when voiced components are present in the speech. A voice-unvoice selector is provided, which actuates double-pole, double-throw switches between a first or unactuated condition and a second or actuated condition. The latter occurs only in response to voiced condition. In the actuated conditions of the switches, the low frequency control signal and the high frequency control signal are employed to modulate the amplitude of output of a blocking oscillator, in two separate channels. It has been explained that the frequency of the blocking oscillator is controlled by the pitch control signal, so that it has the frequency of the pitch of voiced speech and that the blocking oscillator produces extremely sharp pulses. These pulses, amplitude modulated in separate channels, are utilized to excite two parallel tuned ringing circuits. The parallel tuned circuits ring in response to the pulses applied thereto, but their resonant frequencies are 18,000. c.p.s. each. They, therefore, have spectra centered on 18,000. c.p.s. but with harmonic separations equal to pitch frequency and at integral multiples of the pitch frequency. The outputs of the formant multivibrators and the outputs of the excited ringing circuits are then mixed to provide formant filter tones having the harmonic separations of the original speech tones, after the following plan. The 18. kc. excitation signal, the amplitude of which is responsive to low frequency control signal, is applied only to a mixer in the first formant channel of the synthesizer. The spectrum produced in response to high frequency control signal is applied in parallel to two mixers in the second and third formant channels, to which are also applied, respectively, the outputs of the second and third formant multi-vibrators.

The outputs of the several mixers are filtered and combined to provide simulated voiced speech, so long as the original speech contains voiced components.

When the original speech contains unvoiced components, or is silent, the two single-pole, double-throw switches remain in unactuated condition. Low frequency and high frequency control channels are, in this situation connected, respectively, to modulate in two channels the amplitude of output of a noise generator. Signal in the latter channels in turn excite two 18. kc. parallel resonant circuits. The outputs of the latter excited circuits have noise spectra centered on 18 kc., the envelopes of the spectra corresponding with the resonance curves of the excited circuits, which are applied in the following manner. That one of the noise spectra which is controlled in amplitude by the low frequency control signal is applied jointly to the first and second formant channels, and more specifically to the mixers of these channels, for mixing with the outputs of the multivibrators pertaining to the first and second formant channels. That one of the noise spectra which is controlled by the high frequency control signal is applied only to the third formant channel, and more specifically to the mixer thereof, where it is mixed with the output of the third formant channel multivibrator.

Accordingly, a different action takes place according to whether pitch control signal does or does not indicate that pitch is present in the original speech. When pitch is not present a noise-like character is imparted to the synthesized formants, while when voiced speech is to be transmitted, the formants have a spectral distribution containing harmonic separations equal to the pitch frequency.

It is of importance that the 18 kc. pitch frequency spectrum and the outputs of the multivibrators are both phase-locked, with respect to pitch frequency, since thereby the outputs of the several mixers are also phase-locked, and spurious frequency beats due to relative phase variations with time, of mixer inputs, is avoided.

Derivation of pitch frequencies, according to the present invention, is accomplished in a novel manner. Briefly, speech is passed through a 1,000. c.p.s. low-pass filter to remove interference which can be produced by essentially high frequency unvoiced components. The resulting signal is rectified and integrated or averaged to produce essentially a sawtooth voltage having the pitch frequency fundamental rate. As a consequence of this action pitch frequency fundamental components can be generated even though the fundamental pitch is not present in the input speech signal. The sawtooth signal is passed through a pitch filter having 18 db/octave of cut-off above 70 c.p.s. Thereby, harmonics present in the sawtooth voltage are, for any fundamental frequency highly attenuated. The output of the pitch filter is essentially a sinusoid having pitch frequency, i.e., within the range 70.–240. c.p.s.

The latter sinusoid is passed through an inert zone clipper, which clips out base-line noise, and the output of the inert zone clipper is highly amplified, filtered and clipped to form square waves. The latter are virtually devoid of interference caused by ambient noise background at the source, or due to unvoiced sounds. Each cycle of the square wave is converted to at least one pulse of uniform energy content, and the latter are integrated or averaged to form an analogue signal representative of pitch frequency.

A negative zero offset voltage is set into the integrator, and appears in the absence of pitch signal. In response to pitch signals the integrator is arranged to provide O.V. output at 70. c.p.s., output increasing as a function of frequency.

Formant control signals are generated by a formant spectrum tracker or frequency centroid computer. The latter employs parallel channels, which separate a formant spectrum into a number of separate channels. The frequency weighted set of the energies in the channels is summed, and the unweighted set is also summed. The ratio of the two sums represents the frequency centroid. A novel passive matrix is employed to compute the ratio, on a quantized basis.

It is, accordingly, a broad object of the present invention to provide a novel speech analyzer.

It is another broad object of the present invention to provide a novel speech synthesizer.

A further broad object of the invention resides in the provision of a novel centroid frequency computer.

Still a further broad object of the invention resides in the provision of a novel voltage divider.

It is an object of the invention to provide a speech analyzer capable of generating analogue signals having each an upper frequency of about 25 c.p.s., which are representative of those characteristics of speech which impart intelligibility to the speech. It is another object of the invention to provide a system for synthesizing speech in response to these analogue signals.

Still another object of the invention resides in the provision of a system for synthesizing voiced speech having the pitch frequency spectral distribution of true voiced speech.

It is a further object of the invention to provide a narrow band speech communication channel wherein speech formants are synthesized having frequency centroids substantially equal to the frequency centroids of actual speech formants.

It is another object of the invention to provide a speech analyzer for generating a plurality of analogue signals each representative of the frequency centroid of an actual speech formant, for either voiced or unvoiced speech, for generating in response to the analogue signals synthesized formants having the same centroid frequencies as those of the actual speech, to generate analogue control signals representative of energy in the several actual speech formants and to control the energy of the synthesized formants accordingly, and to generate further signal representative of whether the actual speech is silent, voiced or unvoiced, and if voiced of the pitch of the actual speech, and to impart to the synthesized formants the voiced, unvoiced or silent characteristics of the actual speech, including the characteristic pitch of the actual speech.

The above and still further objects, features and advantages of the present invention will become apparent upon consideration of the following detailed description of one specific embodiment thereof, especially when taken in conjunction with the accompanying drawings, wherein.

Figure 1:
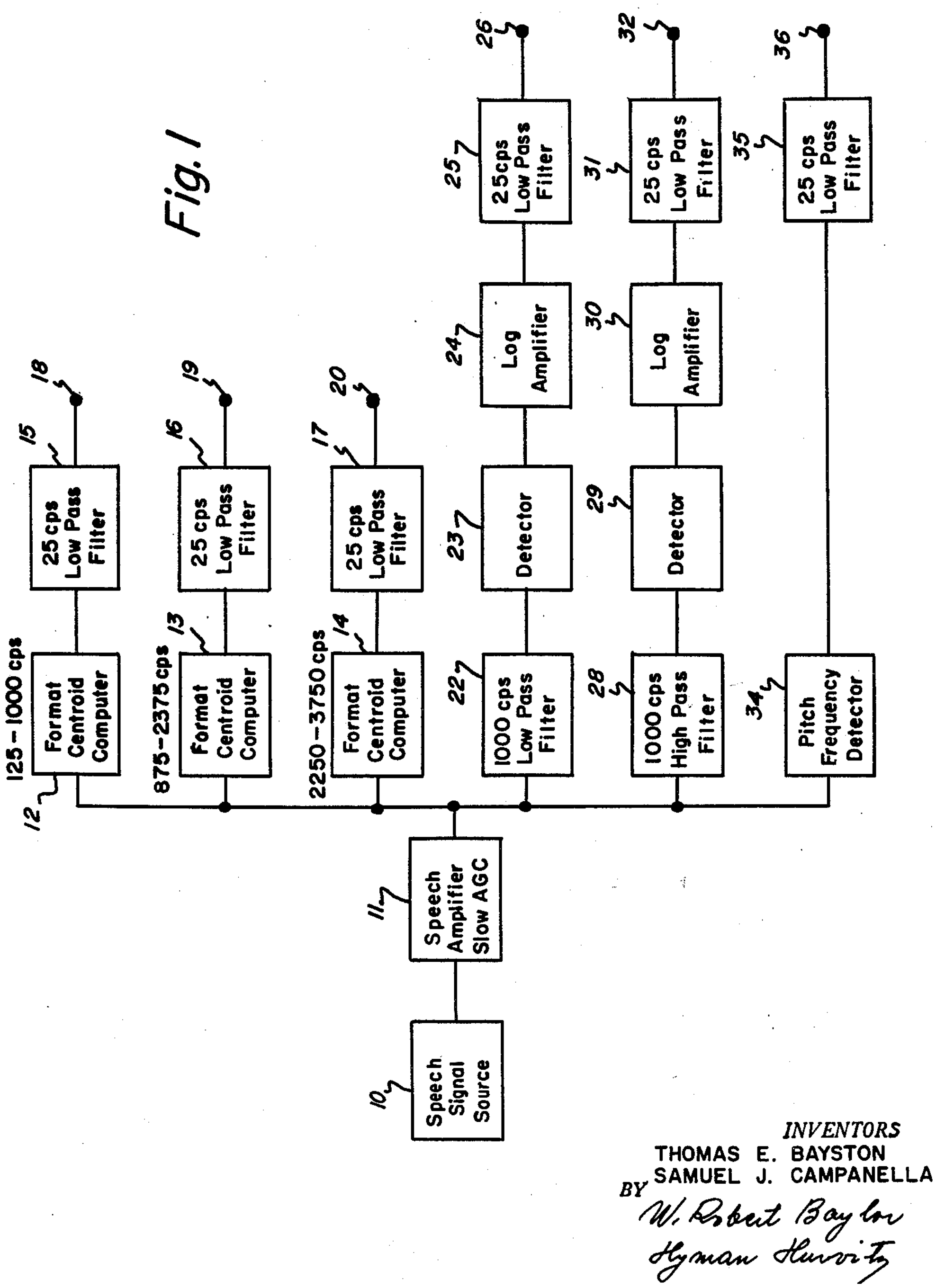
FIGURE 1 is a block diagram of a speech analyzer, according to the present invention.

Referring now more specifically to the accompanying drawings, and particularly to FIGURE 1, which illustrates in block diagram a speech analyzer in accordance with the present invention, the reference numeral 10 denotes a speech source, such as a microphone. Clearly, the speech source may comprise any desired source of speech signals, such as a magnetic reproducer or a radio-receiver in process of detecting speech modulated carrier, so only that the speech source 10 provides an electrical signal which is representative of speech in terms of spectral character of the signal. The speech signal provided by speech signal source 10 is amplified in a speech amplifier 11 having an automatic gain control or AGC circuit, operative on a relatively long term basis, so that on the average the level of speech provided that the output of the speech amplifier 11 is fairly uniform.

The output of the speech amplifier 11 is applied in parallel to six channels, the first channel including a formant centroid computer for a speech formant in the range of 125. c.p.s. to 1,000. c.p.s. The second channel includes a formant centroid computer for a speech formant in the band 875. c.p.s. to 2,375. c.p.s. The third channel includes a formant centroid computer for the speech formant in the band 2,250. to 3,750. c.p.s. The several formant centroid computers 12, 13 and 14 are sometimes hereinafter denominated formant trackers, and their mode of operation will be described hereinafter. The frequency centroid of an array of frequencies is given by the ratio of the frequency weighted sum of spectrum samples about a reference frequency axis $$(1) \qquad \Sigma_1^n (f_k - f_r) A_k$$

to the sum of spectrum samples $$(2) \qquad \Sigma_1^n A_k$$

where $f_r$ is a reference frequency and may be the lowermost or uppermost frequency of the array, or a center frequency if desired, and as convenient, $f_k$ the center frequencies of the samples, and $A_k$ the amplitudes of the samples.

The frequency weighted and unweighted sums are computed by a D.C. analogue computer, and the quotient of the results, which is the desired frequency tracking output, is computed by a discrete ratio selector device employing a unique D.C. analogue computer. The latter will be described hereinafter. Suffice it to say that the output of the formant centroid computer of the formant trackers consists of a slowly varying D.C. signal, the amplitudes of the signals corresponding with the frequency centroid of the frequency band subject to computation.

It has been found by extensive experimentation that formant centroids represent correctly the position and frequency make-up of a speech formant, in distinction to other criteria, and that a speech formant may be reconstructed or synthesized with relatively high accuracy from knowledge of the value of the frequency centroid. It has further been found that the three formants selected, in the presently described embodiment of the present invention, together are capable of representing speech to a high degree of accuracy, and that the formant representative signals generated by the trackers are capable by suitable processing for use as a basis for synthesizing speech which is substantially as intelligible as the original speech, from which the formant centroid signals had been derived.

At the output of the formant centroid computer 12 is connected a low-pass filter having cut-off at 25 c.p.s. Similar filters 16 and 17 are connected in cascade with the formant centroid computers 13 and 14. There, accordingly, appears at the output terminals 18, 19 and 20 slowly varying D.C. analogue signals representative of the frequency centroids of three formants continuously being derived from speech, and these control signals are capable of transmission to a remote location for use in synthesizing speech.

A fourth channel is provided, including a low-pass filter 22, having a cut-off at 1,000. c.p.s., for selecting the components of speech input to the analyzer which fall below 1,000. c.p.s. The band of frequencies passed by the filter 22 is detected in a detector 23, passed through a logarithmic amplifier 24 for compressing the possible range of spectrum energy available at the output of the detector 23, and the output of the logarithmic amplifier 24 is passed through a low-pass filter 25 having a cut-off at 25 c.p.s. Accordingly, at the output terminal 26 of the fourth channel appears a slowly varying D.C. signal, the amplitude of which at every instant of time represents the average energy in that part of the speech signal comprised of frequencies below 1,000. c.p.s. The value of cut-off selected is in a measure arbitrary, i.e., it is not critical, but has been found effective in practice.

A fifth channel in the analyzer includes a high-pass filter 28, which passes all speech frequency components above 1,000 c.p.s. to a detector 29. The output of the latter represents the average energy of the speech in that part of its frequency spectrum which falls above 1,000 c.p.s. The signal so available is passed to a logarithmic amplifier 30 for purpose of compressing the amplitude variations of the energy, and the output of the logarithmic amplifier 30 is passed through a 25 c.p.s. low-pass filter 31 and applied to a terminal 32.

The output of the speech amplifier 11 is applied to a sixth channel comprising a pitch frequency detector 34, in cascade with a 25 c.p.s. low-pass filter 35 and an output terminal 36. It is the function of the pitch frequency detector 34 to detect the pitch frequency of voiced speech and to provide to the input of the low-pass filter 35 a positive signal having an amplitude proportional to the fundamental pitch frequency where zero amplitude is taken as a reference at 70 c.p.s. On the other hand in the absence of pitch frequency in the output of the speech amplifier 11, which may occur either because the sounds involved are not voiced, i.e., generated in the larynx, or because there is a gap in the transmitted speech, a fixed negative signal is generated by the pitch frequency detector 34. Accordingly, at the terminal 36 appears either a negative signal of fixed amplitude, when the speech is unvoiced or when there is a gap in the speech, or a positive signal of amplitude proportional to pitch frequency when the speech is voiced.

Figure 2:
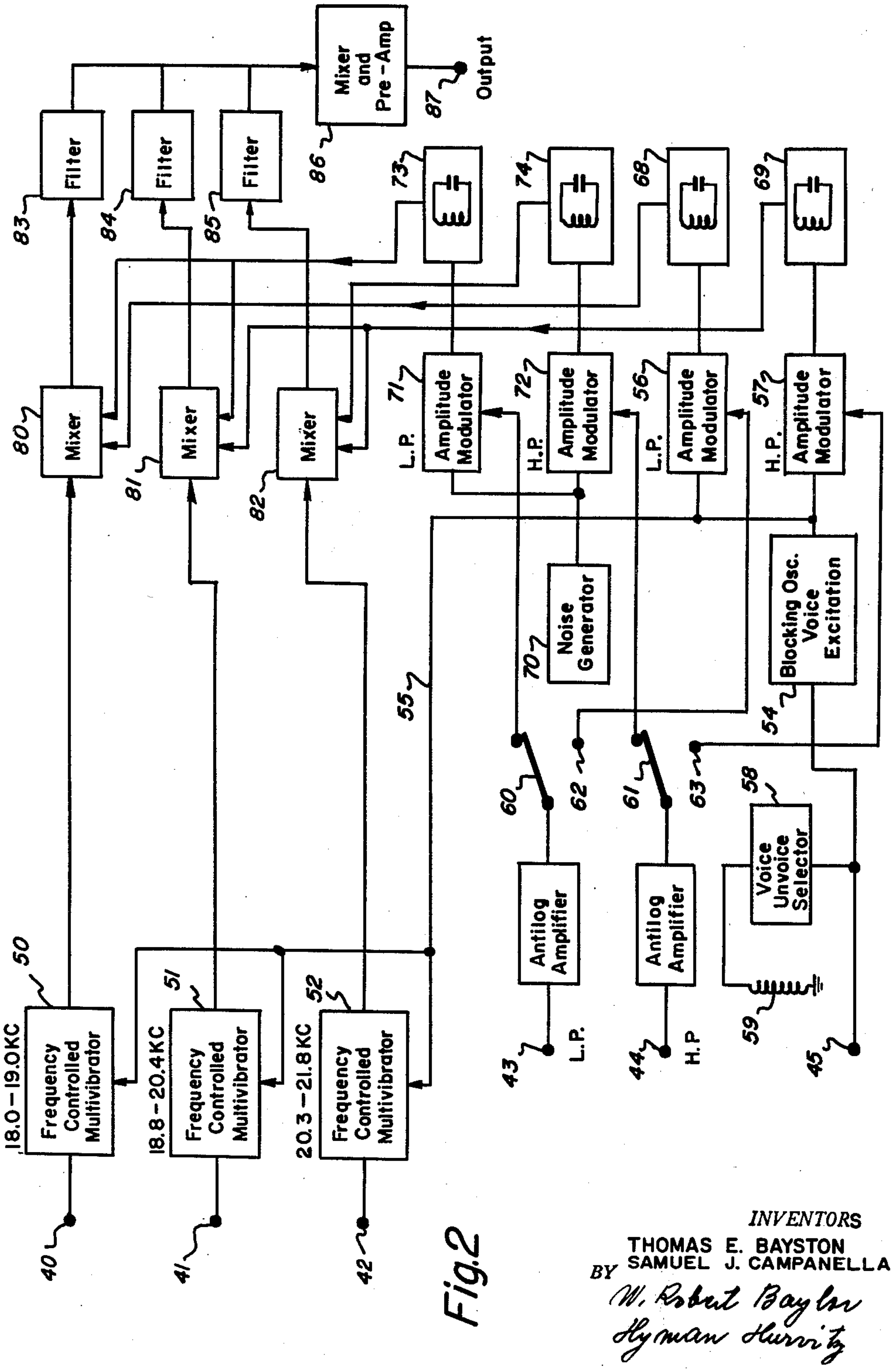
FIGURE 2 is a block diagram of a speech synthesizer, according to the present invention.

The signals available at the six output terminals 18, 19, 20, 26, 32 and 36 of the analyzer of FIGURE 1 are transmitted in any convenient fashion to a remote synthesizer, illustrated in block diagram in FIGURE 2 of the accompanying drawings, and having six input terminals 40, 41, 42, 43, 44 and 45, respectively, connected to the output terminals of the analyzer of FIGURE 1 in the recited order of the latter.

The input terminal 40 supplies control signal to a frequency-controllable oscillator, specifically a multi-vibrator 50, the frequency of which is a function of the amplitude of the control signal applied to the terminal 40, within the range from 18.0 to 19.0 kc. for the possible range of control signal amplitudes. A similar multi-vibrator 51 is connected to the terminal 41, and has a range 18.8 to 20.4 kc. Still another multi-vibrator 52 is connected to the terminal 42, and has the frequency range 20.3 to 21.8 kc. The multi-vibrators 50, 51 and 52, accordingly, generate frequency spectra, the fundamental frequency of which may vary over the bands specified, in accordance with the control signals supplied thereto, and the frequency bands assigned to the multi-vibrators deviate with respect to a reference value of 18.0 kc., such that the fundamental multi-vibrator frequencies, when 18.0 kc. is subtracted therefrom, will equal the centroid frequencies as computed by the formant centroid computers 12, 13, 14 at the analyzer of FIGURE 1.

Figure 3:
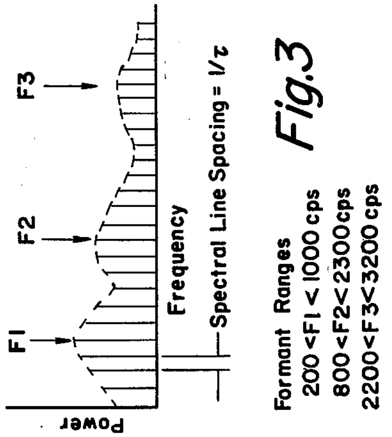
FIGURE 3 is a plot of the spectral distribution of voiced speech signal energy.

The speech formants may have a frequency composition involving spectral lines with spacing equal to the pitch frequency of the voiced components of the speech. A typical spectral distribution is seen in FIGURE 3 of the accompanying drawings, wherein F1, F2 and F3 are the positions of the formant frequencies as calculated by the formant centroid computers, and wherein the spacing between spectral lines equal to $1/\tau$ is the pitch frequency of the voice when the latter includes voiced components, where $\tau$ is the duration of the pitch interval. When the speech does not include speech components, i.e., includes unvoiced components or comprises a gap in the speech, the spectral line distribution disappears, but formants remain present. These, then, have a noise-like spectral character.

In order to impart the desired spectral character to the outputs of the multivibrators 50, 51 and 52, there is provided a blocking oscillator 54, the frequency of which is controlled in response to control signal applied to the terminal 45, so that the output of the blocking oscillator 54 consists of sharp pulses at a repetition rate substantially equal to the pitch frequency. The output of the blocking oscillator 54 is applied by a line 55 to the three multi-vibrators 50, 51 and 52, and serve to synchronize the operations of the latter. In essence, the multi-vibrators run at frequencies established by the analogue control signals applied to terminals 40, 41 and 42. The effect of a pitch pulse is to initiate a group of cycles of output of the multi-vibrators. The latter are therefore phase-locked in response to the pitch pulses, i.e., all the multi-vibrators commence a group of cycles together and simultaneously. The grouped character of the multi-vibrator oscillations gives rise to a spectral composition for the multi-vibrator outputs in which pitch frequency separations, or multiples of these, occur between a carrier frequency and side frequencies. Moreover, the frequencies making up the spectra are phase-locked. The control signals applied to the terminals 40, 41 and 42 in these circumstances control the frequencies of the multi-vibrators 50, 51 and 52, but these are locked precisely in phase in response to the synchronizing pulses supplied from the blocking oscillator 54.

The output of the blocking oscillator 54 is also supplied to the inputs of two amplitude modulators 56 and 57. A voice-unvoice selector 58 is provided, which is controlled in response to the control signal available at the terminal 45, and which energizes a relay coil 59 when negative signal is unavailable at the terminal 45. This implies that the voice-unvoice selector 58 energizes the relay coil 59 in the presence of voiced components of speech, but not otherwise, i.e., not in the absence of speech and not in the presence of unvoiced components. When the relay coil 59 is energized it pulls down two armatures 60 and 61 into contact with contacts 62 and 63. Thereby, control signal available at terminal 43 is applied to amplitude modulator 56 to control its gain, while control signal applied to the terminal 44 is applied to amplitude modulator 57 to control the gain of the latter. Accordingly, at the outputs of the amplitude modulators 56 and 57 appear signals provided by the blocking oscillator 54, but at amplitudes established by the values of the control signals representative, respectively, of low-pass energy and high-pass energy of the original speech.

The amplitude modulator 56 supplies its energy to a parallel tuned circuit or ringing circuit 68, which has a sufficiently high Q that it rings in response to the blocking oscillator output pulses. Similarly, the amplitude modulator 57 supplies its output pulses to a ringing circuit 69. The ringing circuits 68 and 69 are tuned to the resonance frequency 18 kc. The reaction of the impulses applied to the ringing circuits 68, 69 is to generate a gaussian shaped frequency spectrum about 18 kc. as a center, having harmonic content in which the harmonics are integral multiples of the pitch frequency, and are phase-locked by the pitch frequency. When the control signals applied to the terminals 43 and 44 are at their lowest amplitudes, the amplitude modulators 56 and 57 essentially cut-off, so that the ringing circuits 68 and 69 remain unenergized.

A noise generator 70 is provided which supplies its output to two amplitude modulators 71 and 72. The amplitude modulator 71 is controlled by the control signal available at the terminal 43 when the switch arm 60 is in its upper position, i.e., when the relay coil 59 is unactuated, indicating that the character of the speech is unvoiced. Similarly, the amplitude modulator 72 is controlled with respect to its amplification or gain by control signal available at the terminal 44. The amplitude modulators 71 and 72 supply their output to two ringing circuits 73 and 74, respectively, which are similar to the ringing circuits 68 and 69, i.e., have a resonance frequency of 18.0 kc. and a relatively high Q. The spectral characters of the output signal derivable from the ringing circuits 73, 74, is essentially random, in distribution, but the envelope is that of the ringing circuit, so that these outputs are constituted of noise or random components centered on resonant frequencies of the ringing circuits. Again, the amplitude modulators 71 and 72 are arranged to provide no output in response to zero amplitude of control signals at terminals 43 and 44 and to increase their outputs as the control signals increase in amplitude.

Multi-vibrator 50 supplies its output to a mixer 80 and similarly the multi-vibrators 51 and 52 supply their outputs, respectively, to mixers 81 and 82.

The ringing circuit 73 supplies its output to the mixers 80 and 81. The ringing circuit 74 supplies its output only to the mixer 82; the ringing circuit 68 supplies its output to the mixer 80 while the ringing circuit 69 supplies its output only to the mixers 81 and 82. At the output of each of the mixers 80, 81 and 82 are provided low-pass filters 83, 84 and 85, respectively, which select difference frequencies generated by the mixers 80, 81 and 82. These correspond generally with the speech formants, F1, F2 and F3, as these were selected in the analyzer of the system.

The outputs of the filters 83, 84 and 85 are supplied to a suitable linear mixer 86 associated with a pre-amplifier, and the output of the pre-amplifier is supplied to the output terminal 87, where it constitutes synthesized speech output.

It will be observed that the lowest frequency formant F1 is generated in response to noise components or pitch frequency components, according to the energy content of the lowermost portion of the speech spectrum, i.e., in response to the control at terminal 43. This occurs regardless of the voiced or unvoiced character of the speech, but when there are gaps in the speech, all amplitude modulators 71, 72, 56 and 57 are cut off, so that no output appears from the mixers 80, 81 and 82, and a gap in synthesized speech at the output terminal 87.

It further appears that the mid-frequency formant F2 is supplied with signal from the ringing circuits 73 and 69 as follows: The formant filter F2 is controlled in accordance with the low frequency elements of speech when the signal is noise-like, but in response to the high frequency energy of the speech when the speech is voiced. The high frequency formant F3 on the other hand is controlled entirely in response to the high frequency energy of the speech, whether the speech is voiced or unvoiced. It has been found that the specified treatment of the F2 formant results in a more realistic and understandable speech than is otherwise possible, because the F2 formant is far higher in frequency for unvoiced than for voiced sounds.

The importance of the phase-locked character of all the inputs to the mixers 80, 81, 82 is that the outputs are of locked phase, and therefore of steady character. Were the phases unlocked, or occurring at random to each other, the heterodyne products generated by the mixers 80, 81, 82 would have a wavering character, which develops as relative phase of two beating components vary, and which is not characteristic of true speech, and is extremely unpleasant to listen to.

Figure 4:
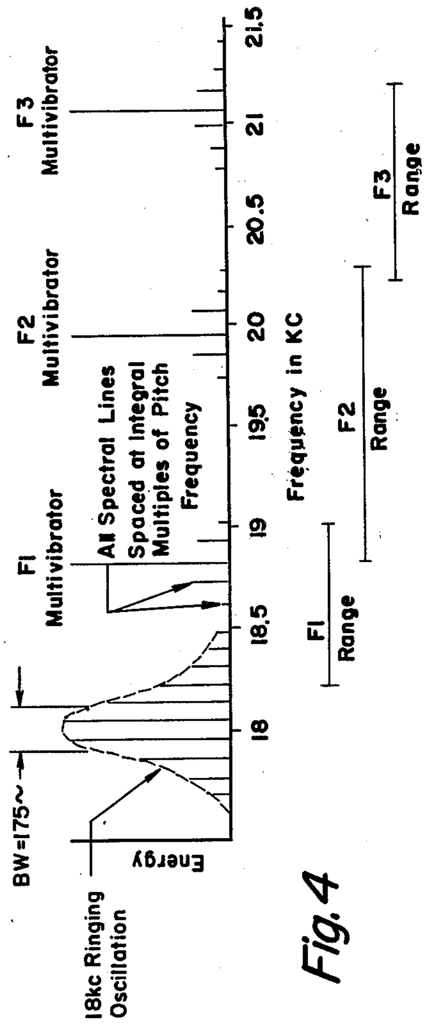

Reference is now made to FIGURE 4 of the accompanying drawings, wherein is illustrated frequency spectra associated with the three-multi-vibrators and with the ringing oscillation. It will be observed that each one of the multi-vibrator outputs, i.e., F1, F2 and F3, when operated in synchronized fashion, i.e., during voiced speech, possess a relatively few harmonic frequencies, spaced apart by the pitch frequency. On the other hand, the responses of the ringing circuits 68 and 69 contain a large number of harmonics also spaced apart by the pitch frequency. Moreover, the center frequencies of the F1, F2 and F3 spectra as generated by the multi-vibrators are spaced from the center frequency of the ringing oscillator spectrum taken as a reference, by values equal to the frequency centroids as calculated by the analyzer. When the output of a multi-vibrator and the output of a ringing circuit are applied to one of the mixers, and the difference frequency selected, the centroid of the difference frequencies then become equal to the formant centroid frequencies, while the spectrum of the difference frequencies becomes essentially that of the ringing circuits. So, in FIGURE 5 there is illustrated a spectrum of the three difference frequency bands, constituting synthesized formants F1, F2 and F3, located at their proper frequency positions, i.e., with their center frequencies at the frequency centroids of the analyzer formants. Since the synthesized formants are symmetrical, the centroids of the synthesized formants and the centroids of the analyzer formants are the same. Moreover, the synthesized spectral formants F1, F2 and F3 contain the same pitch frequencies as do the analyzer formants. Any difference in shapes of the analyzer and synthesizer formants results in discrepancy between the speech as supplied to the analyzer and the speech as synthesized by the synthesizer, but in practice this difference is found to be of little, if any, consequence to the intelligibility of the synthesized speech.

Figure 5:
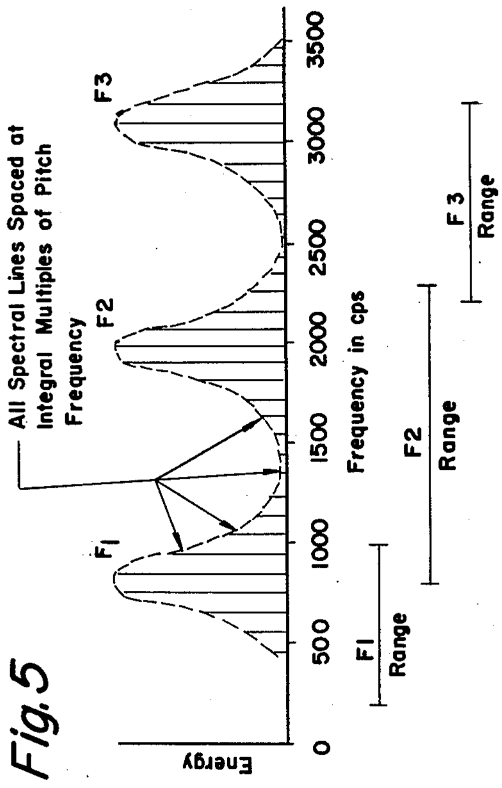
FIGURES 4 and 5 are plots of the spectral composition of certain elements of the synthesizer of FIGURE 2.

While the spectral diagrams of FIGURES 4 and 5 show the general shapes of the various spectra involved in the synthesizer while speech is voiced, it will be appreciated that the general mode of operation remains the same for unvoiced speech, wherein the ringing oscillator spectral distribution is random, but does not appreciably change its shape, i.e., the equally spaced spectral lines disappear and randomly occurring lines take their place. The multi-vibrators 50, 51, 52 in the latter case, do not essentially change their characteristic operation.

Figure 6:
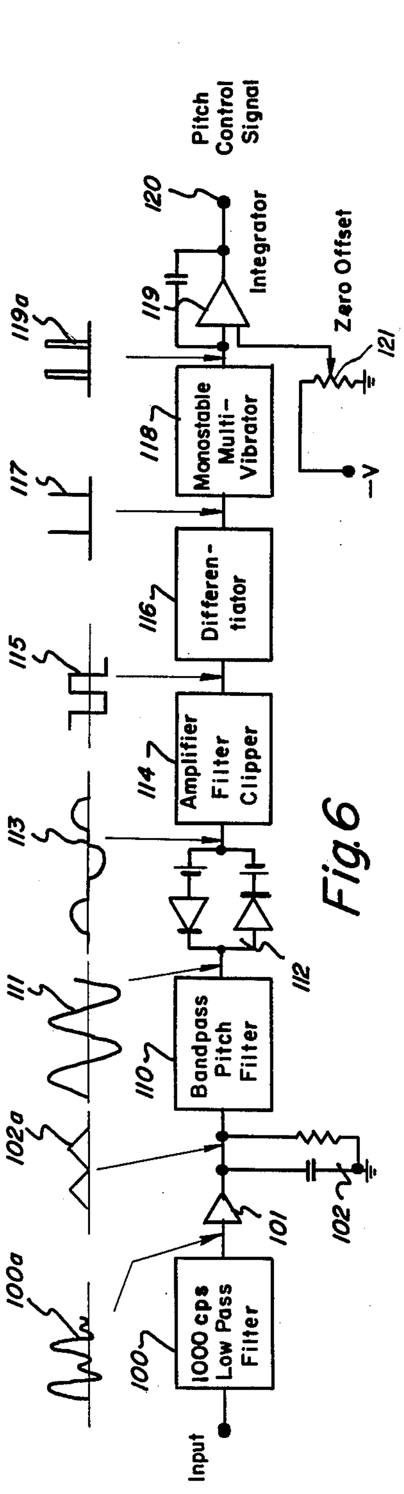
FIGURE 6 is a block diagram of a pitch frequency extractor.

Referring now more specifically to FIGURE 6 of the drawings, there is shown a functional block diagram for deriving pitch frequency from voiced speech signal. Input speech signal is applied to a thousand c.p.s. low-pass filter 100, which has for its function to reduce interference which can be produced by components of unvoiced excitation which occur in the frequency range above 1,000 c.p.s. The signals **100*a* resulting from passage through the filter 100 is rectified in the rectifier 101 and the rectified signal integrated or averaged in an integrator schematically represented at 102. The resultant signal 102*a* is generally of sawtooth wave form and has a recurrence frequency at the pitch frequency fundamental rate (70–240 c.p.s.). The sawtooth signal is passed through a pitch filter 110 which possesses approximately an 18 db octave cut-off above 70 c.p.s. The output of the pitch filter 110 is almost a perfectly sinusoidal signal, since for any fundamental frequency in the pitch frequency range second harmonic is reduced by 18 db fourth harmonic by 36 db, etc. This output contains, therefore, substantially no harmonic content and is almost sinusoidal, as is illustrated at 111. The possibility exists nevertheless that low level noise will have passed through the pitch filter 110, and to remove the latter noise, the sine wave 111 is passed through an inert zone clipper 112, which clips out any signal below a certain level with respect to the zero axis, and consequently clips out low level noise. The output of the inert zone clipper 112 is illustrated at 113, and represents a distorted sine wave. The signal 113 is passed through a system 114 which has a high gain and a narrow band pass characteristic, and which reshapes the wave 113 in the form of a sine wave. Operative with the system 114 is a clipper which shapes the output of the system 114 into square waves 115. These square waves have the frequency of the fundamental pitch rate, and are virtually devoid of interference caused by ambient noise background at the source as well as by unvoiced sounds produced by the speaker. The square wave 115 appears only when voiced sounds are produced, and nothing appears during intervals of silence or during unvoiced excitation. Square wave 115 is passed through a differentiator 116, arranged to provide at its output undirectional pulses 117, derivable from the edges of the square waves 115. Sharp pulses 117 are used to synchronize a mono-stable multi-vibrator 118, which produces one pulse of output, as 119*a*, in response to each input pulse 117, the output pulses 119*a* being, however, of greater energy content than are the input pulses 117. The output pulses 119*a* are integrated in an integrator or averaging circuit 119, at the output terminal 120 of which appears a slowly varying D.C. signal. This signal is proportional to the frequency of the pulses 119*a* generated by multi-vibrator 118, since these are of uniform energy content, per pulse. Accordingly, the signal available at the terminal 120** is an analogue signal having a D.C. level representative of pitch in the original speech, and specifically zero output at 70 c.p.s. input.

Additionally is provided a zero offset voltage source 121, connected to integrator 119 so as to provide a normal negative output of fixed voltage. The latter is overcome by the integrated signal, when the latter exists. In the absence of the latter, i.e. in presence of unvoiced speech or to gaps in speech, the negative offset voltage appears at terminal 120.

Figure 7:
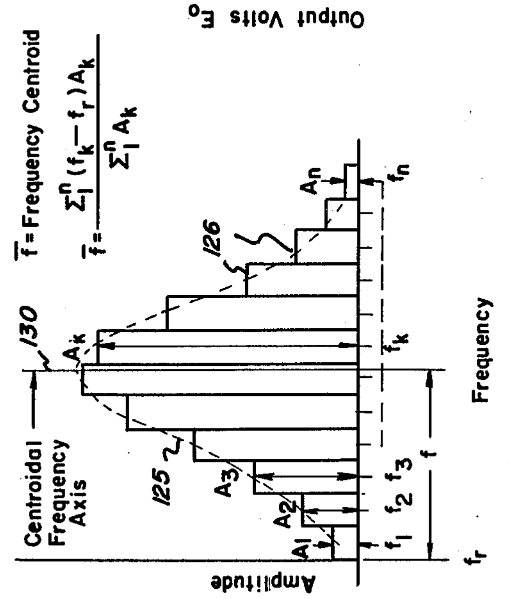
FIGURE 7 is a graphical representation of the computation of a frequency centroid.

In FIGURE 7 of the accompanying drawings, is illustrated in outline 125 the envelope of a speech formant, plotted in terms of amplitude as ordinate against frequency as abscissa. FIGURE 7 illustrates the method of computing frequency centroids of such formants. The formant band is passed through a series of parallel filters, the pass-band of which are shown plotted with the formant envelope 125, as representing the basis of the rectangles 126. In a preferred embodiment of the invention these filters may be 125 c.p.s. wide, and may be adjacent, so that the entire gamut of filters passes substantially the entire formant. The center frequencies of the filters are taken respectively to have the values $f_1, f_2, f_3 \ldots f_n$, etc., plotted in FIGURE 7, the general member being $f_k$, while the heights of the plotted blocks, representing the responses of the filters to the formant frequency content, are taken to have corresponding values $A_1, A_2, A_3 \ldots A_k \ldots A_n$. The lowermost frequency passed by the array of filters is taken to be $f_r$, and is a reference frequency. The frequency centroid $\bar{f}$ is then defined as the sum of the products consisting of the heights of the rectangles $A_k$ times the frequency difference between $f_k$ and $f_r$. This sum is computed and represents one factor of a ratio. The other factor is the sum of the rectangle heights $A_k$. When the latter factor is divided into the former factor, the result is a frequency, which is called the centroid frequency 130. Experiment has shown that the centroid frequency 130 of the spectral distribution 125 constitutes a sufficiently accurate and unique representation so as to permit specification and synthesis of all of the essential articulatory features of speech.

Figure 8:
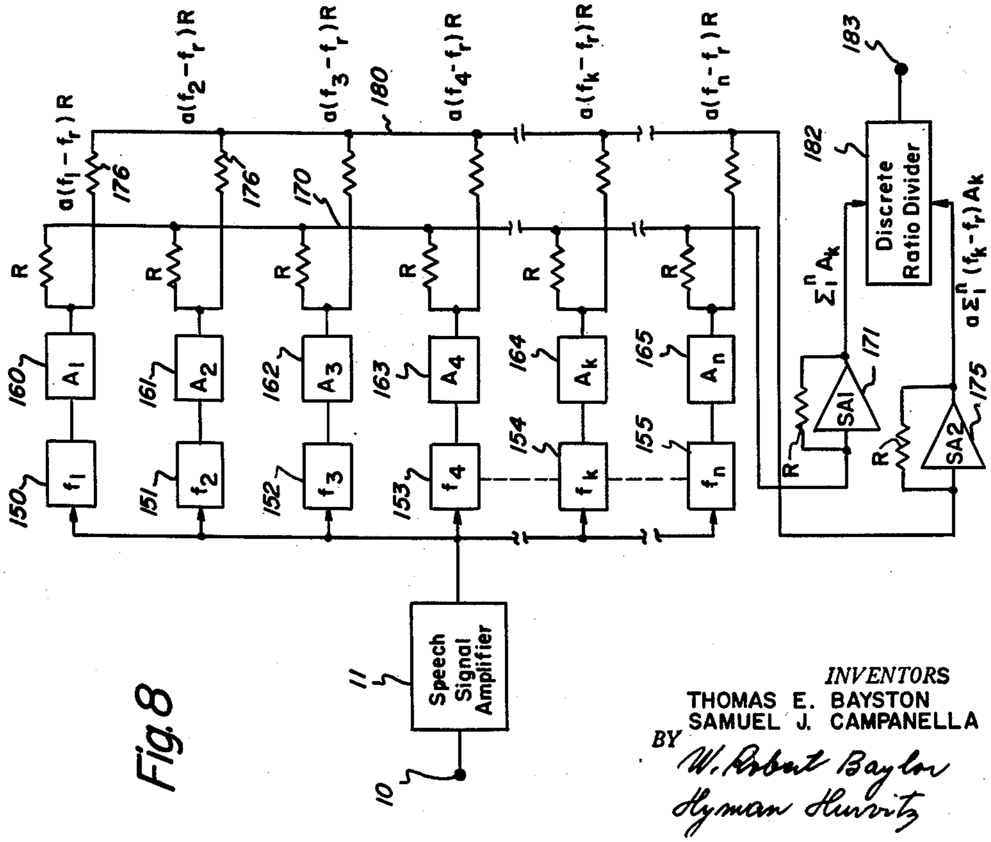
FIGURE 8 is a functional block diagram of a centroid computer.

Reference is made to FIGURE 8 of the accompanying drawings, wherein is illustrated partly in functional block diagram and partly in circuitry, a frequency centroid computer such as is employed in the practice of the present invention. In FIGURE 8, the reference numeral 10 represents a speech signal source and the reference numeral 11 represents a speech signal amplifier, as in FIGURE 1 of the accompanying drawings. The speech signal output from the amplifier 11 is applied in parallel to a bank of filters 150, 151, 152, 153, 154, 155, it being understood that any desired number of filters may be employed, but that in the practice of the present invention the total number may depend upon the formant which is being analyzed. So for formant F1 the band 125 to 1,000 c.p.s. is analyzed, for formant F2 the band 875 to 2,375 c.p.s. is analyzed and for formant F3 the band 2,250 to 3,750 c.p.s. is analyzed. The filters 150 to 155, inclusive, have each a band width 125 c.p.s. and the pass-bands are adjacent. In FIGURE 8 the filter bands have been identified not only by reference numerals but by the frequency designations $f_1, f_2, f_3 \ldots f_k \ldots f_n$, which correspond with the frequency designations applied to the plot of FIGURE 7. At the output of each filter bank is provided an amplitude detector, these being designated by the reference numerals 160, 161, 162, 163, 164 and 165, as well as by the letter designations $A_1, A_2, A_3 \ldots A_k \ldots A_n$, to correspond with the corresponding designations in FIGURE 7. Accordingly, at the outputs of the amplitude detectors 160 to 165, inclusive, are contained D.C. signals which have amplitudes as shown in the exemplary plot of FIGURE 7, these amplitudes representing amplitudes at frequencies $f_1$ to $f_n$, respectively, as illustrated in FIGURE 7, and in general the amplitude $A_k$ corresponding with the frequency $f_k$.

Having thus derived the basic information required for computing a frequency centroid, the outputs of the detectors 160 to 165, respectively, are each passed through a different resistance, these being all equal in value and indicated by the identifying letter R. Resistances R each proceed from an amplitude detector to a common line 170, and the common line 170 is connected to a summing amplifier 171. Since the resistances are all of the same value, the sum of all of the detector outputs is taken with equal weight, to determine the value of $\Sigma_1^n A_k$.

The outputs of the detectors 160 to 165 are also applied, respectively, to a summing amplifier 175, via weighted resistances, 176, the general term of which is a $(f_k - f_r)R$, and the weights of these resistances are determined by the frequency positions of the filter banks 150 to 155 with respect to the array of filter banks, as well as the location of $f_r$. The resistances all terminate in a common line 180, which in turn is applied to the summing amplifier 175, the output of which is the summation $\Sigma_1^n a(f_k - f_r)A_k$. The two sums so derived are applied to a divider 182, and at the output terminal 183 of the latter is generated an analogue signal equal to the ratio of the two input quantities, which represents the desired frequency centroid. This is a D.C. value which may be transmitted to a remote point, to control there the generation of a single frequency equal to the centroid frequency. In the computation, the value $a$ is a proportionality constant adjusted to assure that the value of the unweighted amplitude moment does not exceed the frequency weighted amplitude moment, a restriction imposed by the characteristics of the divider circuit 182.

Figure 10:
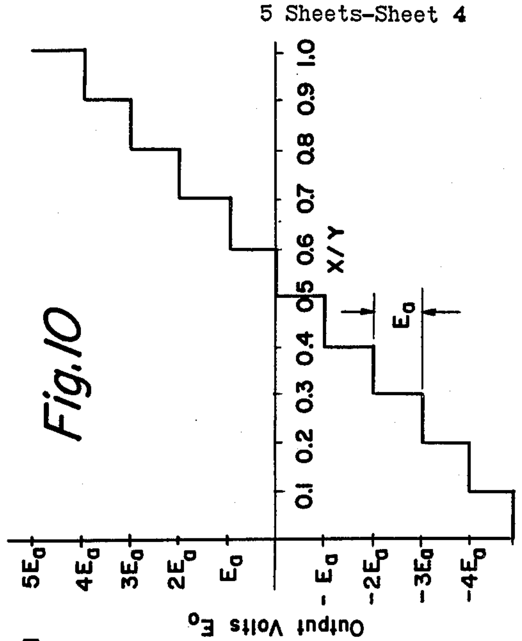
FIGURE 10 is an output voltage function, generated by the divider of FIGURE 9.
Figure 9:
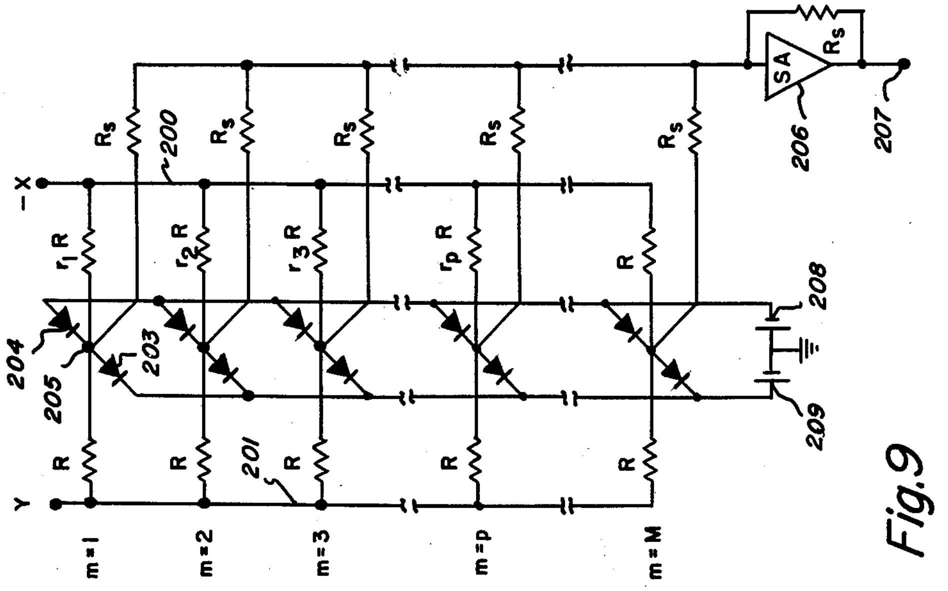
FIGURE 9 is a functional block diagram of a discrete ratio divider, forming part of the computer of FIGURE 8.

The circuit employed to carry out the division operation is shown in FIGURE 9. Ideally, the output of the divider varies in discrete steps as the input ratio $|X/Y|$ traverses the range of values from zero to unity. For proper operation, the following conditions must be imposed: $X<0$, $Y>0$, $|X|\leqslant|Y|$. This restricts the ratio $|X/Y|$ to the range of values from $0<|X/Y|<1$, a condition which is satisfied by appropriate choice of the proportionality constant, "$a$," in Equation 2. The input versus output relationship in the ideal case, i.e., when $|X|>>0$ and $|Y|>>0$, for a 10 step divider is shown in FIGURE 10. This case is referred to as ideal since the slope of the transition between steps is shown to be infinite. In actual operation, this slope will be finite and the edges rounded.

The circuit for a general case of M steps operates in the following manner. To divide the interval from zero to unity into M steps, M resistor pairs are required, each with ratio $r_m=m/M$ where $m=1, 2, 3 \ldots M$. This is achieved in the circuit shown in FIGURE 3 by selecting one of the ratio resistors as R and the other as $r_m$R. The resistors with value R are all connected to the Y input and those with value $r_m$R to the X input. For the $m=p$ resistor ratio pair, when $r_p<|K/Y|\leqslant r_{p+1}$, all the voltages at the resistor pair junction such that $m>p$ will be negative, and those such that $m\leqslant p$ will be positive. These voltages can be limited to $\pm E_a/2$ volts by the action of clamp diodes connected to each junction. Hence for the case such that $r_p<|X/Y|\leqslant r_{p+1}$, the sum of junction voltages (clamped by the diodes) is given by the relation $$(3)\qquad E_0=\frac{E_a}{2}\sum_{m=0}^{m=M}a_m \qquad \begin{array}{l} a_m=1, \quad m\leqslant p \\ a_m=-1, \; m>p \end{array}$$

This summation reduces to the following relation by carrying out the indicated summation.

$$(4a)\qquad E_0=\frac{E_a}{2}\left[\sum_{m=0}^{m=p}a_m \oplus \sum_{m=p+1}^{m=M}a_m\right]$$

$$(4b)\qquad =\frac{E_a}{2}[2p-M]$$

where $p/M<|X/Y|\leqslant(p+1)/M$.

The above equation is used to plot the relation shown in FIGURE 10 for $M=10$. Physically, the relation indicates that as $|X/Y|$ covers the range from zero to unity in M steps, the junction voltages start out all biased in the negative direction when the input ratio is less than $1/M$. When the ratio reaches the value $1/M$, the first junction reverses polarity while all others remain the same as before. This process repeats as the ratio $|X/Y|$ continues to increase through successive increments of $1/M$ until the value of unity is reached. At this point all of the junctions are biased in the positive direction. Thus it is seen that the output voltage ranges from $-ME_a/2$ to $ME_a/2$ in M equal steps as $|X/Y|$ ranges from zero to unity.

The computer employed for obtaining the ratio $$\frac{X}{Y}$$

i.e., the divider 182 is illustrated schematically in FIGURE 9 of the accompanying drawings. Operation of the circuit requires that $|X|\leqq|Y|$, so that the ratio will be less than unity, for all values of the variables.

The X voltage is applied to terminal X, and the Y voltage to terminal Y. The X terminal is connected to a bus 200 and the Y terminal to a bus 201. Connected between the bus 200 and the bus 201 is a plurality of resistance pairs in parallel, the resistances of each pair being connected in series. These resistance pairs are identified by the nomenclature R and $r_m$R where $m$ assumes values 0, 1, 2 . . . M, and M is the total number of discrete values desired to be obtained from the computer, and correspondingly with the number of parallel resistance pairs employed. The resistances directly connected with the bus 201 may be all equal and the resistances connected directly to the bus 200 are all weighted, having values $r_m$R where $m=1, 2, 3 \ldots$ M, and $r_m=m/M$. Since the ratio of the resistances of each pair is the controlling factor in the design of the computer, however, the values R need not all be equal, provided the proper ratios are observed.

The junction of two series connected diodes 203, 204 is connected to each junction 205 between a pair of resistances R, $r_m$R, and all the junctions are connected via summing resistances $R_s$ to the input of a D.C. operational amplifier 206 having an output terminal 207.

The anodes of diodes 204 are all biased negatively by a voltage source 208, having a voltage $$\frac{Ea}{2}$$

while the cathodes of the diodes 203 are positively biased by a source 209 to a value $$\frac{Ea}{2}$$

The sets of diodes 203, 204 are clamp diodes, and limit the voltage at each junction 205 to a value $$\pm\frac{E_a}{2}\text{ volts}$$

The polarity of X is always negative and Y always positive, and $$|X|\gg 0 \text{ and } |Y|\gg 0$$

For this condition the voltage at any junction is for any given value of $m=p$, negative for $m>p$ and positive for $m\leqq p$. However, the values of the voltages are limited by the clamp diodes to $\pm E_a/2$ volts. It follows that the sum of the junction voltages, as measured by the summing amplifier 206, is $$E_0=\frac{E_a}{2}[2p-M]$$

where $p$ is an integer such that $$\frac{p}{M}<\frac{X}{Y}<\frac{p+1}{M}$$

This relation is plotted in FIGURE 10, the plot indicating that as $$\left|\frac{X}{Y}\right|$$

varies over the range from zero to unity in 10 steps the junction voltages are all negative when the value $$\left|\frac{X}{Y}\right|$$

is less than $1/M$. When the first junction attains the value $1/M$ the first junction only reverses polarity, and as $$\left|\frac{X}{Y}\right|$$

increases through successive increments of $1/M$, successive junctions reverse polarity until $$\left|\frac{X}{Y}\right|=1$$

At this point all the junctions are biased positively. The value of output voltage available at terminal 207 accordingly assumes value $$-\frac{MEa}{2}\text{ to }\frac{MEa}{2}$$

in M equal steps as $$\left|\frac{X}{Y}\right|$$

varies from zero to unity.

In practice a twenty step divider was employed for each formant tracker. The operation of the system of FIGURE 9 may be further clarified by considering one junction, and by considering that it joins a fixed resistance R to a variable resistance $s$R. If $X=-1Y$, the junction will be at zero potential, if $s=1$. If $s$ is less than unity, the junction will go positive, while if $s$ is greater than unity, the junction will go negative. If $Y=-2X$, for example, the junction will be at zero potential if $s=1/2$ and the junction will go negative if X increases, or Y decreases, from the stated relation.

In summary, any number of parallel test paths may be employed, connected to the Y and X terminals, and these may have values selected to provide selectively $$+\frac{Ea}{2} \text{ or } -\frac{Ea}{2}$$

for any desired ratio $$\frac{X}{Y}$$

The summation algebraically of the positive and/or negative junction voltages, then, provides a measure of $$\frac{X}{Y}$$

in quantized fashion, but the quanta need not be uniform over a range of values of $$\frac{X}{Y}$$

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A system for generating a signal having a distinguishable characteristic representative of a speech formant frequency centroid, comprising a plurality of parallel filters having equal adjacent pass bands, a source of speech signals, means for passing said speech signals through said filters, means to provide samples representative of the responses of said filters to said speech signal, means for deriving a first analogue quantity from said samples representative of the sum of the samples and a further analogue quantity from said samples representative of the frequency weighted sum of said samples, and means responsive to said first and further analogue quantities for deriving another analogue signal representative of their ratio.

2. In a speech compression system, means for computing the frequency centroids of three formants in response to said speech and for providing three analogue signals, each representing a different one of said centroids, representative each of one of said frequency centroids, means for providing a fourth analogue signal representative of the high frequency energy of said speech, means for providing a fifth analogue signal representative of the low frequency energy of said speech, and means for providing a sixth analogue signal representative of the pitch frequency of said speech, said last signal having a predetermined characteristic in absence of any distinct pitch frequency in said speech, said predetermined characteristic being different than the characteristic of signals representing distinct pitch frequencies in said speech.

3. The combination according to claim 2, wherein is further provided means responsive to all said analogue signals and said distinguishable characteristic for synthesizing speech corresponding substantially to said first-mentioned speech.

4. The combination according to claim 3, wherein said means responsive to said analogue signals and said distinguishable characteristic include three sources of synthesized speech formants each comprising a band of frequencies and a distribution of amplitudes generally corresponding with the frequencies and amplitude distributions of the first-mentioned formants and having corresponding frequency centroids.

5. In a system for regenerating speech formants, a multi-vibrator of relatively high output frequency, means for controlling the approximate output frequency of said multi-vibrator in response to a first control signal, a source of speech pitch signal of relatively low frequency, means for controlling the frequency of said speech pitch signals in response to a further control signal, means for synchronizing the frequency of said multi-vibrator in response to the frequency of said pitch signal, means for generating a damped sine wave having a frequency having a low difference from the frequency of said multi-vibrator in response to each cycle of said pitch signal, means for heterodyning said damped sine waves with the output of said multi-vibrator, and means for deriving a low frequency spectrum of difference frequencies from said means for heterodyning.

6. In a system for generating unvoiced speech formants, a source of control signal having an amplitude representative of a formant of unvoiced speech, a multi-vibrator of frequency above the speech band, means for controlling the frequency of said multi-vibrator in response to said control signal and as a function thereof, a source of wide band noise signal, a ringing circuit having a resonant frequency at least several times said low frequency and falling within said wide band, means for exciting said ringing circuit in response to said noise signal, means for heterodyning the excitation response of said ringing circuit with the output of said multi-vibrator, and a low pass filter coupled to said heterodyning means for selecting a low frequency noise spectrum therefrom.

7. In a system of speech compression wherein said speech includes voiced and unvoiced components in succession, and wherein the content of said speech may be represented in terms of three speech formants each having spectrum content which varies in the course of said speech and which may include pitch frequencies and noise frequencies, a speech analyzer comprising means for deriving from said speech first, second and third formants, means responsive respectively to said formants for developing first, second and third distinct formant control signals having amplitudes, respectively, representative continuously of the frequency centroids of the corresponding speech formants, means for generating a fourth control signal having an amplitude which is representative of the energy content of high frequency components of said speech, means for generating a fifth control signal having an amplitude which is representative of the low frequency energy content of said speech, means for generating a sixth control signal having an amplitude which is representative of the pitch frequency of said speech while said speech is voiced and a seventh control signal generated in response to absence of voiced speech, said means being all responsive to said speech.

8. The combination according to claim 7, wherein is further provided means responsive to said control signals for synthesizing three formants having each approximately the spectral constitution of a different one of said first-mentioned formants.

9. The combination according to claim 7, wherein is further provided a first multi-vibrator, a second multi-vibrator, a third multi-vibrator, means for controlling the frequency of said first multi-vibrator in response to said first control signal, means for controlling the frequency of said second multi-vibrator in response to said second control signal, and means for controlling the frequency of said third multi-vibrator in response to said third control signal, so that each multi-vibrator has a frequency corresponding with a different one of said frequency centroids, but displaced therefrom upwardly by a fixed frequency value greater than any speech frequency and common to all said multi-vibrators, a noise source, a pitch frequency signal source having a frequency controlled in response to said sixth signal to be substantially equal to the pitch frequency of said speech while said speech is voiced, means responsive to said last-mentioned pitch frequency signal for synchronizing said multi-vibrators substantially to have each a spectral distribution including frequencies spaced apart by said pitch frequency and multiples thereof, means for generating separate harmonic rich signals having frequency components spaced apart in noise-like relation and in pitch frequency relation and having each a frequency centroid substantially equal to said fixed frequency value, means for heterodyning said harmonic rich signals with the outputs of said multi-vibrators selectively as a function of the characters of said fourth, fifth, sixth and seventh control signals in a manner adapted to synthesize speech formants corresponding audibly with said first-mentioned speech formants.

10. A centroid computer for speech signal formants, comprising a plurality of parallel connected band-pass filters of equal pass-band width, said filters occupying immediately adjacent channels and having center frequencies $f_k$, extending between $f_1$ and $f_n$, means for passing said speech signal through said filters, amplitude detectors for deriving from said filters D.C. analogue voltages $A_k$ representative of the signal amplitudes passed by said filters, and means responsive to said D.C. analogue voltages for computing a centroid frequency $\bar{f}$ by performing the following mathematical operation on the values of $A_k$ and the frequencies $f_k$ $$\bar{f}=\frac{\sum_1^n a(f_k-f_r)A_k}{\sum_1^n A_k}$$

where $a$ is a constant and $f_r$ is a reference frequency, which is the same for the entire summation.

11. The combination according to claim 10, wherein is provided a first and second channel emanating from each of said detectors, a resistance of value R in series with each of said first channels, a D.C. operational adder in series with all said resistances, said value R being constant for all said first channels, whereby said D.C. operational adder provides a first output signal proportional to $\Sigma_1^n A_k$, further resistances each connected in series with a different one of said second channels, said further resistances having values weighted according to values of $F_k$, said further resistances being all connected in cascade with a further D.C. operational adder, whereby said further D.C. operational adder provides a second output signal proportional to $\Sigma_1^n a(f_k-f_r)A_k$, where $a$ is a constant.

12. The combination according to claim 11, wherein is provided a divider circuit responsive to said first and second output signals for providing said centroid frequency $$\bar{f}=a\frac{\sum_1^n (f_k-f_r)A_k}{\sum_1^n A_k}$$

13. The combination according to claim 12, wherein said divider circuit is arranged and adapted to provide quantized values of output analogue signal each representative of a value of $\bar{f}$.

14. The combination according to claim 13, wherein said divider circuit is a matrix, said matrix including two buses to which are applied said first and second output signals, respectively, an array of elements consisting of first and second resistances in series, means for connecting said elements between said buses in parallel with each other, each element constituting a voltage divider, said voltage dividers having relatively quantized division ratios, means for clamping the voltages existing at the junctions of the first and second resistances of said elements between pre-assigned levels, and means for summing the voltages appearing at said junctions.

15. In a system for synthesizing a formant having the same frequency centroid as an actual speech formant and having a spectral composition including phase-locked frequency components separated in pairs by a speech pitch frequency, an oscillator, means for controlling the frequency of said oscillator to have a displacement from a reference frequency value equal to said frequency centroid, a pitch frequency source, means for imparting to the signal output of said oscillator frequency components phase-locked to the output of said pitch frequency source and having frequency displacements in pairs equal to multiples including unity of said pitch frequency, wherein said pitch frequency is lower than the frequency of said oscillator, and wherein is provided means responsive to the output of said pitch frequency source for controlling the initiations of successive trains of cycles of said signal output.

16. In a system for generating speech formants, an oscillator of relatively high output frequency, means for controlling the frequency of said oscillator over a range of values in response to a remotely generated control signal, a source of sharp pulses of relatively low frequency, means for controlling said low frequency over a range of values in response to a remotely generated control signal, means for initiating successive trains of oscillations of said oscillator in response to said sharp pulses, whereby to generate a spectrum having a mean frequency equal to the frequency of said oscillator and side band frequencies separated from the frequency of said oscillator at integral multiples of said low frequency and locked in phase with respect to the timing of said sharp pulses.

17. The combination according to claim 16, wherein is further provided a tuned circuit, means for driving said tuned circuit in response to said sharp pulses, said tuned circuit having a relatively high resonant frequency, means for deriving from said tuned circuit in response to said sharp pulses a frequency spectrum having an envelope conforming to the selectivity characteristic of said tuned circuit and including distinct components spaced apart by integral multiples of said pulse frequency and phase-locked to said pulses, means for heterodyning said frequency spectrum and said first-mentioned spectrum and deriving the difference heterodyne products.

References Cited in the file of this patent

UNITED STATES PATENTS

| | | |
|---|---|---|
| 2,098,956 | Dudley | Nov. 16, 1937 |
| 2,151,091 | Dudley | Mar. 21, 1939 |
| 2,339,465 | Dudley | Jan. 18, 1944 |
| 2,458,227 | Vermeulen et al. | Jan. 4, 1949 |
| 2,803,801 | Cunningham | Aug. 20, 1957 |
| 2,817,711 | Feldman | Dec. 24, 1957 |
| 2,821,683 | Koenig | Jan. 28, 1958 |
| 2,857,465 | Schroeder | Oct. 21, 1958 |
| 2,860,187 | David et al. | Nov. 11, 1958 |
| 2,866,001 | Smith | Dec. 23, 1958 |
| 2,868,882 | Di Toro | Jan. 13, 1959 |
| 2,905,385 | Larse | Sept. 22, 1959 |
| 2,908,761 | Raisbeck | Oct. 13, 1959 |
| 2,911,476 | Kramer | Nov. 3, 1959 |
| 2,919,067 | Boyd | Dec. 29, 1959 |
| 2,927,969 | Miller | Mar. 8, 1960 |